Nov. 26, 1940.　　　J. W. HALE　　　2,222,813
CHANGE SPEED DEVICE
Filed March 9, 1939　　　2 Sheets-Sheet 2
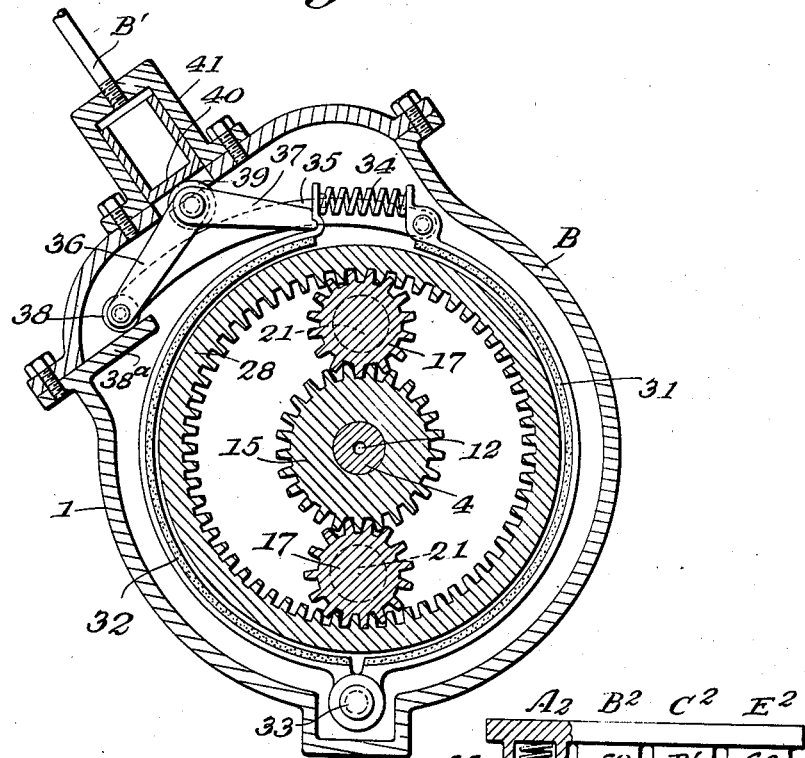
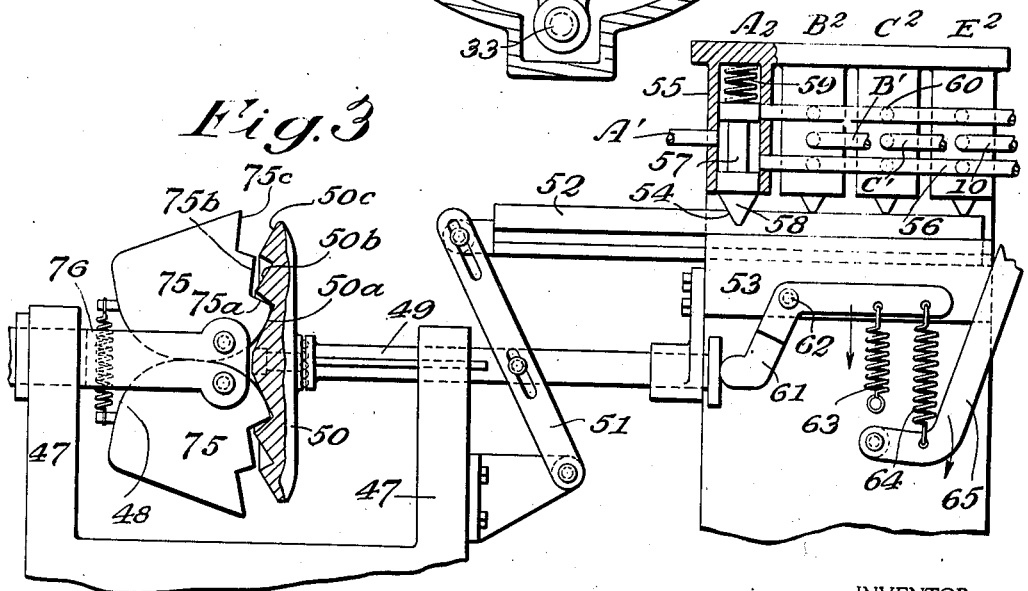
INVENTOR.
Jesse W. Hale
BY Spear, Rawlings&Spear
ATTORNEYS.

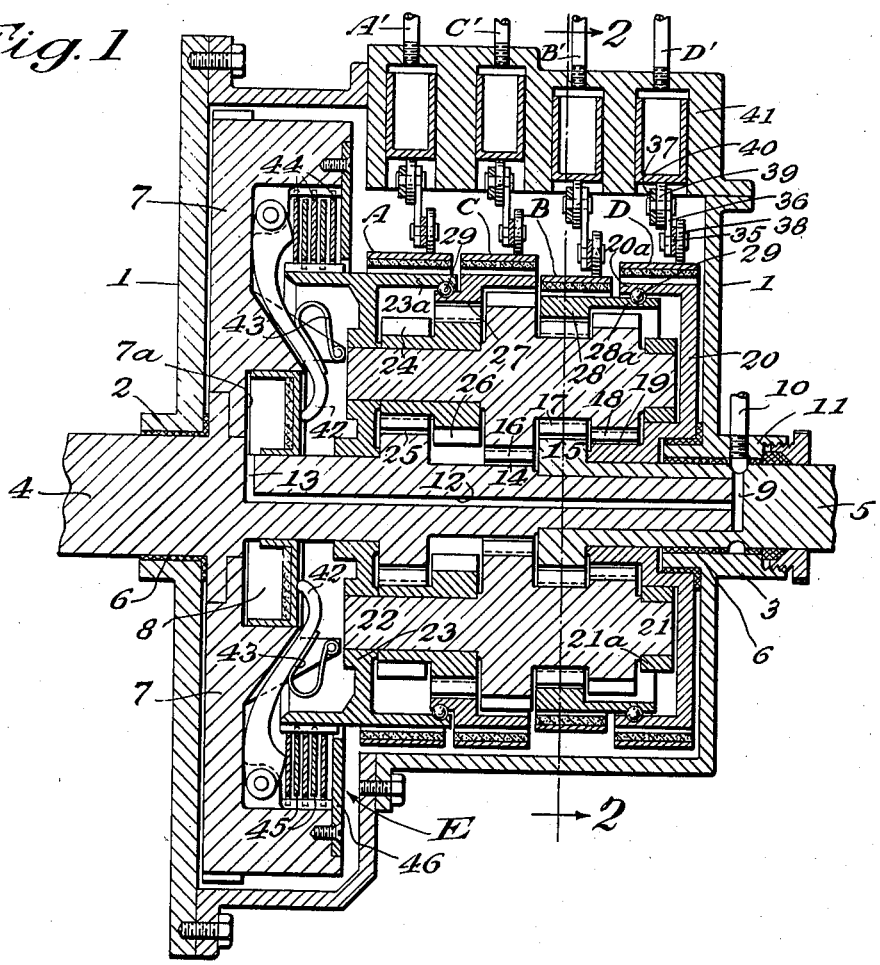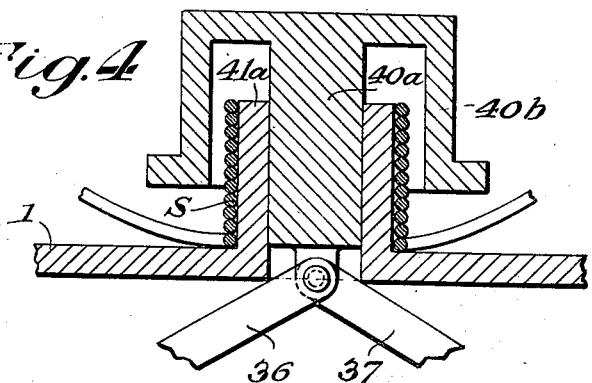

Patented Nov. 26, 1940

2,222,813

UNITED STATES PATENT OFFICE 2,222,813

CHANGE SPEED DEVICE

Jesse W. Hale, Newton, Mass.

Application March 9, 1939, Serial No. 260,698

29 Claims. (Cl. 74—260)

My present invention relates to a novel change speed device.

In accordance with my present invention, I employ an idler assembly to connect the drive and driven shafts. The idler assembly is rotatable independently of the shafts and in my invention the ratio established by that assembly is varied by the use of one or more independently rotatable reactors, each of which when restrained is adapted to establish a predetermined ratio between the shafts through its control of the planetary action of the idler assembly. By this construction, I am able to produce a simple and compact change speed device well adapted for any use where driving and driven elements are to be coupled at different ratios.

In the drawings I have illustrated an illustrative embodiment of my invention from a consideration of which and the specification, the nature of my invention and its many advantages will be readily apparent. In the drawings:

Fig. 1 is a longitudinal section through an embodiment of my invention.

Fig. 2 is a section through the device along the lines 2—2 of Fig. 1.

Fig. 3 shows one form of automatic control of brake and clutch operating means, and Fig. 4 is a sectional view of a modified form of brake operating means.

In accordance with my invention, I use a casing 1 having aligned ports 2 and 3 for the drive shaft 4 and the driven shaft 5 respectively. Bushings, where shown, are indicated by the reference numeral 6.

The drive shaft 4 carries a member 7 that may constitute the fly wheel, provided with an annular recess 7ª to receive the piston 8 slidably supported on the drive shaft 4. The driven shaft 5 is bored to receive and support the end of the shaft 4 and is provided with a radial passage 9 adapted to effect communication between the conduit 10 in the casing hub 11 and the recess 7ª through the axial bore 12 and the radial bore 13 in the shaft 4 so that fluid under pressure may actuate the piston 8.

The drive shaft 4 carries a driving gear 14 and the driven shaft 5 carries a driven gear 15. The gears 14 and 15 are connected by the primary step idler gears with the gear 16 being in mesh with the gear 14 and the gears 17 being in mesh with the gear 15. The primary step gears also include gears 18 in mesh with a gear 19 integral with the end plate or support 20 supported on the driven shaft 5 for rotation independently thereof.

The shaft ends 21 of the idler gears are mounted in a support 21ª rotatable independently of the support 20. The shaft ends 22 are carried by the end frame or support 23 mounted on the drive shaft 4 for independent rotation.

Secondary step idler gears are carried by the shafts 22 for rotation independently thereof with the smaller gears 24 being in mesh with the gear 25 on the drive shaft 4 and the larger idler gears 26 in mesh with an internally toothed gear or reactor 27. The gears 17 are also in mesh with an internally toothed gear or reactor 28. If desired, the secondary step idler gears may be supported on the carrier or frame 23 by separate shafts.

Because the end plates or frames 20 and 23 are securely positioned, I form the end plate 23 with flange 23ª overhanging the gear 27. Adjacent surfaces of the flange 23ª and the gear 27 are formed with ball races for the balls 29. The end plate or frame 20 and the gear 28 are likewise formed as at 20ª and 28ª so that one overhangs the other with the portions 20ª and 28ª being formed with races for the balls 29. By this construction the reactor gears 27 and 28 are held in position relative to the supports 23 and 20 respectively.

As the step idler gears and the means employed to support them are rotatable independently of each other and the shafts 4 and 5, it will be apparent that in order for the shafts to be coupled effectively brakes and clutches must be employed.

As shown in the drawings, I have provided brakes A, B, C, and D for the end plate 23, the gear 28, the gear 27, and the end plate 20 respectively. As the brakes employed are identical and of conventional construction, I have confined my description of the brakes to the brake B shown in Fig. 2. As is shown in Fig. 1, the end plates 20 and 23 and the gears 27 and 28 are all formed to present a suitable surface for engagement by any suitable brake means.

As shown in Fig. 2, the brake B consists of a pair of shoes 31 and 32 pivotally supported at one end as at 33 while their other ends are normally spaced apart by a spring 34.

While, as I have stated, any brake may be employed and any means utilized to actuate the brakes, I have shown in the drawings means by which the brakes may be actuated by fluid under pressure or by electricity.

For the actuation of the brakes, I have shown a link 35 pivotally connected to the brake shoe 31 and a link 36 pivotally connected to the link 35 and to a second link 37 adapted to contact the brake shoe 32. The pivotal connections of the links include the rollers 38 and 39 with the roller 38 being adapted to travel over the casing shelf 38ª when the other roller 39 is depressed by the piston 40 in the cylinder 41. Identical means are employed to actuate each of the brakes, but for convenience I have indicated conduits for fluid pressure as A¹, B¹, C¹, and D¹. If desired, the cylinders may be formed in one block as shown in Fig. 1 and supported by the casing 1 as shown in Fig. 2.

If desired, electrical means may be employed to actuate the brakes and the clutch. In Fig. 4, I have shown a solenoid adapted to actuate any one of the brakes. In this embodiment of my invention, the links 36 and 37 are pivotally connected to the stem 40ª slidably mounted in the hub 41ª around which is positioned the solenoid S. The stem 40 includes a cap 40ᵇ adapted to fit over the solenoid S when it actuates the stem 40ª to effect brake engagement.

In order to lock the independently rotatable support 23 to the member 7, I have provided levers 42 pivotally carried by the member 7 and adapted to be actuated by the piston 8 against the action of springs 43 to carry clutch plates 44 slidably carried by the member 7 and clutch plates 45 slidably carried by the end plate 23 against the backing plate 46 on the member 7. The clutch mechanism just described to lock the member 7 and the end plate 23 together will hereafter be referred to as the clutch E.

Operation

Assuming now that the brakes A, B, C, and D and the clutch E are disengaged and that the drive shaft 4 rotates in a clockwise direction, the unitary idler gears 16, 17, and 18 planetate in a counterclockwise direction because of the load on the driven shaft 5.

Before considering the forward speeds, the reverse drive may be considered. Assuming that the brake D is applied so that the gear 19 is held against rotation, the counterclockwise planetation of the idler gears is limited depending on the ratio between the gears 14, 16, 18, and 19 with the gear 17 being effective to rotate the driven shaft gear 15 provided that the ratio between the gears 17 and 15 is greater than the ratio between the gears 18 and 19.

When the brake A is engaged, rotation of the support 23 is restrained and, therefore, planetation of the idlers is prevented with the result that the shafts 4 and 5 are connected at a ratio dependent on the gears 14, 16, 17, and 15. In the illustrated embodiment of my invention, the ratio established by these gears affords a suitable low speed.

When only the brake B is restrained, rotation of the gear 28 is prevented and therefore the idler gears are planetated slowly in the same direction as that of the drive shaft 4. The rate of forward planetation depends on the ratio between the gears 17 and 28 and between the gears 17 and 15. In the embodiment of my invention illustrated, the ratio of these gears is effective to establish a suitable second speed.

When only the brake C is restrained, the gear 27 is held against rotation and the secondary step gears carried by the primary idler now become effective to control the forward planetation of the primary idler. The rate of forward planetation of the primary idler is determined by the ratio of the gears 25, 24, 26, and 27 which are selected in the embodiment of my invention illustrated in the drawings to increase the speed of planetation of the primary idler to establish a suitable third speed.

When the clutch E is engaged, the support 23 is locked to the member 7 and the shafts 4 and 5 are locked together to establish a direct drive.

Control of the clutch and the brakes

From the foregoing, it will be appreciated that in the operation of my device, only one of the brakes or the clutch may be actuated at one time and while change speed devices in accordance with my invention may be subjected to any desired basis of control, I have shown in Fig. 3 an automatic control.

Because the shafts 4 and 5 are not effectively connected until a brake or the clutch is engaged, the engagement of the low speed brake may be employed in lieu of a clutch. Manual controls (not shown) for the power utilized to operate the low speed brake A and the reverse brake D are therefore contemplated.

In Fig. 3, I have shown a governor comprising weights 75 pivotally mounted on a shaft 76 supported by the frame 47 preferably driven by the driven shaft 5. A spring 48 may be employed to connect the ends of the weights 75.

The frame 47 slidably supports a rod 49 carrying a head 50. The weights 75 and the head 50 are formed with a triplicate of cam surfaces 75ª, 75ᵇ, 75ᶜ, and 50ª, 50ᵇ, and 50ᶜ.

A lever 51 pivotally connected to the rod 49 and to the frame 47 is pivotally connected to a rod 52 slidably supported in the support 53. The rod 52 has a notch 54. The support 53 carries a plurality of valves. Because these valves are identical, only one of them is described in detail and in order that each may be readily associated with the brake or clutch that it controls, I have identified them as the valves A², B², C², and E².

Each of the valves A², B², C², and E² comprises a casing 55 into which a conduit 56 in communication with a source of fluid under pressure (not shown) and a valve member 57 adapted to connect the conduit 56 to the conduit A¹, B¹, C¹, and 10 respectively when a head 58 is carried into the notch 54 by the spring 59 when the rod 52 has been moved by the governor so that a head 58 and the notch 54 are in alignment. It will also be appreciated that this construction affords a detent action. When the notch 54 and the heads 58 are not in alignment, the valve members 57 are positioned so that the conduits A¹, B¹, C¹, or 10 are in communication with the relief conduits 60.

Because it is desirable to subject the governor to a control by the operator to render its automatic operation flexible, I have indicated a lever 61 pivoted as at 62 and in engagement with the rod 49. The lever 61 is under the influence of a spring 63 offering a fixed resistance to action of the governor while a second spring 64 connected to the lever 61 is under the influence of a second lever 65 that may be assumed to be under the control of the operator so that the resistance of the spring 64 may be varied to vary the resistance to the action of the governor.

It will thus be seen that in accordance with my invention, I have provided a simple and compact novel change speed device.

What I therefore claim and desire to secure by Letters Patent is:

1. A change speed device comprising a pair of shafts, a gear on each of said shafts, step gears connecting said gears, a freely rotatable member carrying said step gears, means to hold said member against rotation for a low ratio, means connected with said step gears to rotate said member forwardly for a second ratio, means to connect one of said shafts and said member as a unit for a direct drive, and means mounted on and rotatable with one of said shafts to actuate said connecting means.

2. A change speed device comprising a drive shaft, a driven shaft, step gears connecting said shafts, a freely rotatable member carrying said step gears, means to hold said member against rotation for a low ratio and means carried by said member separately connected to said drive shaft to rotate said member forwardly for a second ratio, and means to connect said drive shaft and said member as a unit for a direct drive.

3. A change speed device comprising a pair of shafts, the step gears connecting said shafts, a freely rotatable member carrying said step gears, means to hold said member against rotation for a low ratio, means connected with the step gears to rotate said member forwardly for a second ratio, separate means including a gear on one of said shafts to rotate said member forwardly for a third ratio, and means to connect said shafts and said member as a unit for direct drive, either one of said shafts constituting the drive shaft and being rotatable in either direction.

4. The device of claim 1 in which said second means include a freely rotatable internally toothed gear and means to restrain said gear from rotation, said last named means including a source of power and a control for said power.

5. The device of claim 2 in which said second means include a freely rotatable internally toothed gear and means to restrain said gear from rotation, said last named means including a source of power and a control for said power.

6. A change speed device comprising a pair of shafts, step gears connecting said shafts, a freely rotatable member carrying said step gears, means to hold said member against rotation for a low ratio, means connected with said step gears to rotate said member forwardly for a second ratio, separate means including a gear on one of said shafts to rotate said member forwardly for a third ratio, and means to connect said shafts and said member as a unit for direct drive, said second and third named means each including a freely rotatable internally toothed gear, and means to restrain each of said gears from rotation.

7. A change speed device, a drive shaft, a driven shaft, means connecting said shafts, said connecting means including a differential step gear, and means to cause said step gear to planetate in the same direction as, but slower than, said drive shaft, said last named means comprising an auxiliary gear train directly connected to said drive shaft including a second differential step gear carried by said first step gear for rotation independently thereof and adapted to control the planetation of said first named step gear, and means to render said auxiliary gear train effective.

8. A change speed device, a drive shaft, a driven shaft, means connecting said shafts, said connecting means including a differential step gear, a freely rotatable carrier for said step gears and means to cause said step gear to planetate in the same direction as, but slower than, said drive shaft, said last named means comprising an auxiliary gear train directly connected to said drive shaft including a second gear carried by said carrier for rotation independently thereof, and means to render said auxiliary gear train effective.

9. A change speed device comprising a casing, a drive shaft, a driving gear on said shaft, a driven shaft, a driven gear on said shaft, step gears connecting said gears within said casing, a freely rotatable member carrying said step gears, power operated means to hold said member against rotation for a low ratio between said shafts, power operated means to cause said member to rotate forwardly for a second ratio, power operated means within said casing and rotatable with said drive shaft to connect said drive shaft and said member for a direct drive, and power operated means within said casing to increase reverse rotation of said member to effect reverse rotation of said driven shaft.

10. A change speed device comprising a casing, a drive shaft, a driving gear on said shaft, a driven shaft, a driven gear on said shaft, step gears connecting said gears within said casing, a freely rotatable member carrying said step gears, power operated means to hold said member against rotation for a low ratio between said shafts, power operated means to cause said member to rotate forwardly for a second ratio, power operated means within said casing and rotatable with said drive shaft to connect said drive shaft and said member for a direct drive, power operated means within said casing to increase reverse rotation of said member to effect reverse rotation of said driven shaft, said increasing means including a freely rotatable gear and means to restrain said gear, said last named means including a source of power and a control for said power.

11. A change speed device comprising a drive shaft, a driven shaft, a gear on each of said shafts, step gears connecting said gears, a freely rotatable member carrying said step gears, means to hold said member against rotation for a low ratio and means separately connected with said drive shaft to rotate said member forwardly for a second ratio, means to connect said drive shaft and said member for a direct drive, and means to increase reverse rotation of said member to effect reverse rotation of said driven shaft.

12. A change speed device comprising a drive shaft, a driven shaft, a gear on each of said shafts, step gears connecting said gears, a freely rotatable member carrying said step gears, means to hold said member against rotation for a low ratio and means separately connected with said drive shaft to rotate said member forwardly for a second ratio, means to connect said drive shaft and said member for a direct drive, means to increase reverse rotation of said member to effect reverse rotation of said driven shaft, and said increasing means including a freely rotatable gear and means to restrain said gear.

13. A change speed device comprising a drive shaft, a driven shaft, step gears connecting said shafts, a freely rotatable member carrying said step gears, means to hold said member against rotation for a low ratio and means connected with said drive shaft to rotate said member forwardly for a second ratio, means to connect said drive shaft and said member for a direct drive, and said second means including a second gear rotated with said drive shaft.

14. A change speed device comprising a casing, a drive shaft entrant of one end of said casing and a driven shaft entrant of the other end of said casing, means connecting said shafts including differential step gears connecting said shafts, a freely rotatable carrier for said step gears, power operated means to hold said carrier against rotation for a low speed connection between said shafts, power operated means to planetate said step gears forwardly for a higher speed connection between said shafts, and power operated means within said casing to drive said shafts, said step gears and said planetating means as a unit, said last named power operated means being rotatable with said drive shaft.

15. A change speed device comprising a casing, a drive shaft entrant of one end of said casing and a driven shaft entrant of the other end of said casing, means connecting said shafts including differential step gears connecting said shafts, a freely rotatable carrier for said step gears, power operated means to hold said carrier against rotation for a low speed connection between said shafts, power operated means to cause said step gears to planetate forwardly for a higher speed connection between said shafts, power operated means to drive said shafts, said step gears and said planetating means as a unit, said last named control means including means to connect said carrier and said drive shaft, said last named means being within said casing and rotatable with said drive shaft.

16. A change speed device comprising a drive shaft, a driven shaft, means to connect said shafts at predetermined ratios, said means including freely rotatable members, means to restrain each of said members, resilient means to effect disengagement of said restraining means, and means to effect engagement of said restraining means against the action of said resilient means, said engaging means comprising a toggle mechanism including a pair of toggle members of equal length, a link connecting one of said toggle members to said restraining means, a guide for said toggle mechanism, and means to actuate said engaging means.

17. A change speed device comprising a drive shaft, a driven shaft, means to connect said shafts at predetermined ratios, said means including freely rotatable members, means to restrain each of said members, resilient means to effect disengagement of said restraining means, and means to effect engagement of said restraining means against the action of said resilient means, said engaging means comprising a toggle mechanism including a pair of toggle members of equal length, a link connecting one of said toggle members to said restraining means, a guide for said toggle mechanism, and means to actuate said engaging means including fluid pressure operable means, said fluid pressure operable means including a cylinder disposed substantially radially to said shafts and a piston within said cylinder.

18. A change speed device comprising a drive shaft, a driven shaft, means to connect said shafts at predetermined ratios, said means including freely rotatable members, means to restrain each of said members, resilient means to effect disengagement of said restraining means, and means to effect engagement of said restraining means against the action of said resilient means, said engaging means comprising a toggle mechanism including a pair of toggle members, a link connecting one of said toggle members to said restraining means, a guide for said toggle mechanism, and means to actuate said engaging means including electrically operated means.

19. A change speed device comprising a drive shaft, a driven shaft, means to connect said shafts at various ratios, said means including a control member, a governor in control of said means, said governor comprising a shaft and weight members pivotally carried by said shaft for movement radially thereof and said weight members and said control member having coacting stepped surfaces to effect definite axial movements of said control as said weight members move radially.

20. In a change speed device, a drive shaft, a driven shaft, a reactor rotatable independently of said shafts, means connecting said shafts, said connecting means including separate driving means independently carried by said reactor, reactive means to control each of said driving means to control the speed of said reactor, and means to render each of said reactive means operative.

21. In a change speed device, a drive shaft, a driven shaft, a reactor rotatable independently of said shafts, means connecting said shafts, said connecting means including separate driving means independently carried by said reactor, reactive means to control each of said driving means to control the speed of said reactor, means to render each of said reactive means operative, and said means including a source of power and a control for said power, and means responsive to driven shaft speed to actuate said control.

22. A change speed device, a drive shaft, a driven shaft, a primary gear on each of said shafts, a secondary gear on one of said shafts, first, second, and third reactors rotatable independently of said shafts, a pair of independently rotatable step gears carried by said first reactor, one of said step gears being in mesh with said gears and said second reactor and the other of said step gears being in mesh with said secondary shaft gear and said third reactor, and means to hold each of said reactors against rotation to connect said shafts at a predetermined ratio.

23. A change speed device, a drive shaft, a driven shaft, a primary gear on each of said shafts, a secondary gear on one of said shafts, first, second, and third reactors rotatable independently of said shafts, a pair of independently rotatable step gears carried by said first reactor, one of said step gears being in mesh with said primary gears and said second reactor and the other of said step gears being in mesh with said secondary shaft gear and said third reactor, means to rotate said first reactor with one of said shafts, and means to hold each of said reactors against rotation to connect said shafts at a predetermined ratio.

24. A change speed device, a drive shaft, a driven shaft, a primary gear on each of said shafts, a secondary gear on one of said shafts, first, second and third and fourth reactors rotatable independently of said shafts, a pair of independently rotatable step gears carried by said first reactor, one of said step gears being in mesh with said primary gear, said second reactors and said third reactor and the other of said step gears being in mesh with said secondary shaft gear and said fourth reactor, and means to hold each of said reactors against rotation to connect said shafts at a predetermined ratio, said third reactor when restrained by its holding means establishing a reverse drive of said driven shaft.

25. A change speed device, a drive shaft, a driven shaft, a primary gear on each of said shafts, a secondary gear on one of said shafts, first, second, and third and fourth reactors rotatable independently of said shafts, a pair of independently rotatable step gears carried by said first reactor, one of said step gears being in mesh with said primary gear, said second reactor and said third reactor and the other of said step gears being in mesh with said secondary shaft gear and said fourth reactor, means to hold each of said reactors against rotation to connect said shafts at a predetermined ratio, said third reactor when restrained by its holding means establishing a reverse drive of said driven shaft, and means to rotate said first reactor with one of said shafts to establish a direct drive.

26. In a change speed device, a drive shaft, a driven shaft, a primary gear on each of said shafts, a secondary gear on one of said shafts, a reactor rotatable independently of said shafts, a pair of independently rotatable step gears carried by said reactor, one of said step gears being in mesh with said primary gears and the other of said step gears being in mesh with said secondary shaft gear, normally inoperative reactive means driven by each of said step gears adapted when operative to establish a predetermined speed of said reactor relative to said drive shaft, and means to render said reactive means operative.

27. In a change speed device, a drive shaft, a driven shaft, a primary gear on each of said shafts, a secondary gear on one of said shafts, a reactor rotatable independently of said shafts, a pair of independently rotatable step gears carried by said reactor, one of said step gears being in mesh with said primary gears and the other of said step gears being in mesh with said secondary shaft gear, normally inoperative reactive means driven by each of said step gears adapted when operative to establish a predetermined speed of said reactor relative to said drive shaft, means to render normally inoperative means operative, and means to rotate said reactor with one of said shafts.

28. In a change speed device, a drive shaft, a driven shaft, a primary gear on each of said shafts, a secondary gear on one of said shafts, a reactor rotatable independently of said shafts, a pair of independently rotatable step gears carried by said reactor, one of said step gears being in mesh with said primary gears and the other of said step gears being in mesh with said secondary shaft gear, normally inoperative reactive means driven by each of said step gears adapted when operative to establish a predetermined speed of said reactor relative to said drive shaft, one of said normally inoperative means including means to establish a reactive speed of said reactor effecting a reverse drive of said driven shaft, and means to render said reactive means operative.

29. In a change speed device, a drive shaft, a driven shaft, a primary gear on each of said shafts, a secondary gear on one of said shafts, a reactor rotatable independently of said shafts, a step gear in mesh with said primary gears, a second step gear in mesh with said secondary gear, means carried by said reactor supporting said step gears for rotation independently thereof and of each other, reactive means driven by each of said step gears adapted to control the reactive ratio of said reactor, and means to render said reactive means effective.

JESSE W. HALE.